J. REICHERT.
TIRE CHAIN.
APPLICATION FILED APR. 4, 1917.
1,292,879.
Patented Jan. 28, 1919.
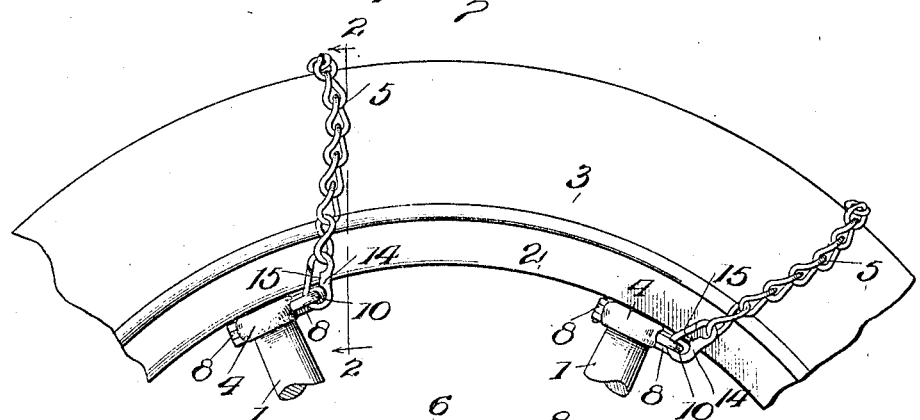
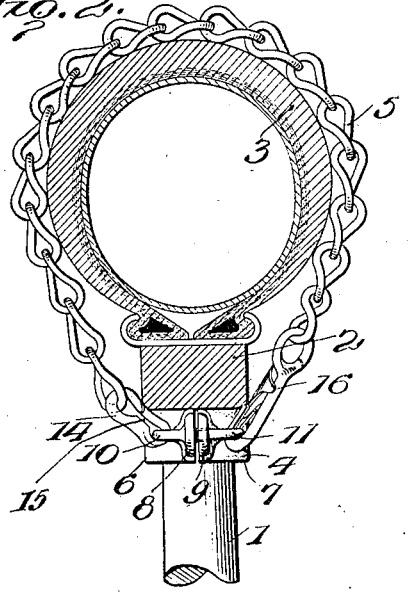
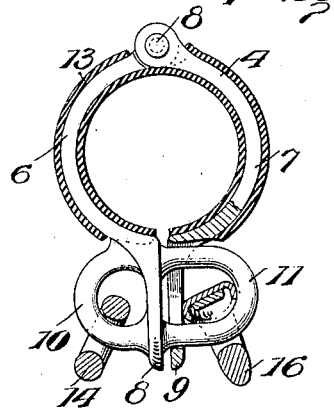
John Reichert, Inventor
By Hubert E. Peck, Attorney

UNITED STATES PATENT OFFICE.

JOHN REICHERT, OF RACINE, WISCONSIN.

TIRE-CHAIN.

1,292,879.   Specification of Letters Patent.   Patented Jan. 28, 1919.

Application filed April 4, 1917. Serial No. 159,704.

*To all whom it may concern:*

Be it known that I, JOHN REICHERT, a citizen of the United States, and resident of Racine, county of Racine, and State of Wisconsin, have invented certain new and useful Improvements in and Relating to Tire-Chains, of which the following is a specification.

This invention relates to certain improvements in and relating to tire chains; and the objects and nature of the invention will be readily understood by those skilled in the art in the light of the following explanation of the accompanying drawings, illustrating what I now believe to be the preferred embodiments and mechanical expressions of my invention from among other formations, arrangements and constructions within the spirit and scope of the invention.

It is an object of the present invention to provide an emergency traction device which can be readily and quickly applied to a motor vehicle wheel when in the mud or snow or under other conditions where extra traction is required, and which can be applied to such wheel whether or not the wheel is equipped with a tire chain of the type now in general use.

It is a further object of the invention to provide improvements in a device for attachment to the wheel of a vehicle to increase the traction thereof, of the type embodying a clamp applied to a spoke of the vehicle wheel and a traction element adapted to be fastened to and maintained in operative position on the vehicle wheel by said clamp.

It is a further object of the invention to provide a tire chain provided with a clamp adapted to be locked on a spoke of a wheel, and a chain connected to the clamp and adapted when in operative position on the wheel to lock the clamp to the spoke and when released from operative position to unlock the clamp and release it from the spoke, whereby the tire chain can be applied to and locked on a wheel by a single operation and released from the wheel by a single operation.

The invention consists in certain novel features in construction and in combinations and arrangements as more fully and particularly set forth and specified hereinafter.

Referring to the accompanying drawings:

Figure 1, is a side elevation of a portion of a vehicle wheel to which several tire chains of my invention are attached.

Fig. 2, is a transverse section taken on the line 2—2, Fig. 1.

Fig. 3 is a view looking down upon the spoke clamp and lock, which is in a horizontal position, resting upon one side and partly in section.

Fig. 4, is a perspective view of the spoke clamp and lock in opened unlocked position.

The present invention provides a tire chain comprising a length of chain, or other traction element, which is connected at one end to a clamp or lock adapted to fit on and around a spoke of a vehicle wheel and to be locked thereon and therearound by the other or free end of said chain or traction element. That is, the free end of the traction element is not merely fastened to the clamp or lock to maintain it in operative position on the vehicle wheel but is fastened thereto in such a manner that it locks the clamp upon the spoke. The arrangement of clamp and traction element being such that by the single act of connecting the free end of the traction element to the clamp the latter is locked to a spoke and the element is operatively maintained on the vehicle wheel.

In the accompanying drawings I show the preferred form and arrangement of spoke clamp and traction element which latter is preferably a length of chain. A portion of a vehicle wheel is disclosed in Fig. 1, having the usual spokes 1, rim 2, and tire 3. In Fig. 1, I have shown two tire chains embodying my invention applied to adjacent spokes, although it is understood that any number of such tire chains may be applied to a wheel and on any desired spokes thereof. The tire chain comprises a clamp and lock 4 and the traction element 5. The clamp 4 is locked around a spoke 1 and the traction element 5 is passed over and around the tire 3 and is connected to the clamp 4 at opposite sides thereof.

The clamp 4 is formed of two members or jaws 6 and 7 which are pivotally connected at 8. The free ends of the jaws 6 and 7 are extended or projected from the jaws to form the arms 8 and 9, which are parallel when the clamp is in closed position and are opposite the pivotally connected ends of the clamp at 8. The arm or extension 8 of the jaw 6 is formed with two loops or ears 10 and 11 which are on opposite sides thereof and lie in the same longitudinal plane with the jaw 6, and the loop or ear 11 is considerably longer than the ear 10 for the purpose appearing hereinafter. It will be seen that when the clamp is in closed or locked position the ear 11 projects from the side of the arm 8 adjacent arm 9 and that the ear 10 projects from the opposite or outer side of arms 8.

A longitudinal slot or opening 12 is formed in the arm or extension 9 of sufficient length and width to permit the ear 11 passing and extending therethrough when the clamp is in closed or locked position. As before mentioned, the ear 11 is made longer than the ear 10, in order that it will project a sufficient distance beyond the arm 9, as shown by Fig. 3 of the drawings. In the particular example illustrated, this ear 11 is formed of a length permitting it, when the clamp is in closed position, to extend approximately the same distance from the outer side of arm 9 as the ear 10 extends from arm 8, thus presenting equal size ears when the clamp is in closed position.

A suitable covering 13 of rubber, leather or the like, may be placed on the jaws of clamp 4 to prevent chafing or marring the spoke and rim of the wheel when locked thereon.

A chain or other traction element 5 is connected at one end by means of a link 14 to the ear 10. This link 14 is of the split type and is provided on one side with an interior shoulder 15. This construction prevents the link from becoming twisted and jammed out of position with respect to the end of chain 5 and loop or ear 10. The length of the chain 5 varies with the size of wheel and tire to which it will be applied but is preferably always of a length which will permit at least some movement of the chain circumferentially of the wheel. The free end of the chain 5 is provided with a snap hook 16 which is adapted to be fastened to the loop or ear 11 of the clamp 4 as will be explained hereinafter.

The method of applying a tire chain constructed and arranged as described, is as follows: The clamp 4 having the chain 5 or other traction element, connected at one end to the loop or ear 10 thereof, and provided on its free end with a snap hook, or the like 16, is opened, to the position as shown in Fig. 4, and is placed around a spoke 1 of the wheel. The chain 5 is then passed over and around and transversely across the periphery of the tire with the free end carrying the snap hook 16 depending downwardly on the opposite side of the wheel. The clamp 4 around the spoke 1, is closed so that it assumes the position disclosed by Fig. 3, with the large loop or ear 11 extending through and beyond the slot or opening 12 in the arm 9. In this position the clamp is fastened tightly on and around the spoke 1, but is not locked thereon. To lock the clamp upon the spoke and to fasten the chain or traction element 5 in operative position on the wheel, the snap hook 16 is connected to the large ear 11 on the opposite side from the link 14 which connects the other end of the traction element to the clamp. Thus it will be seen that the clamp 4 has been locked to the spoke and the traction element operatively fastened in position on the wheel and across the tire by the single act of connecting the snap hook 16 to the ear 11.

The hook 16 is preferably made sufficiently large so that when connected to the ear 11, it will bear against the slotted arm 9 and maintain the same pressed against the arm 8, in this manner the looseness and play between the free ends of the jaws of the clamp is taken up and the same is maintained closed around the spoke 1.

Tire chains of my invention are intended for emergency use and use in combination with tire chains of the usual type where those are found insufficient to furnish the required traction to the wheels of the vehicle. A number of chains constructed in accordance with the present disclosures may be carried in the tool box or other convenient place on a vehicle ready for immediate use when it is desired to increase the traction of the wheels. These chains are found very useful and efficient when the wheels of the vehicle sink into mud holes or the like and it is found that the usual type of tire chain fails to give sufficient traction for the vehicle to pull itself from the hole or holes. In such an instance, several of these chains can be quickly fastened to the wheels, over whatever traction devices may be already applied to the wheels, if any, and the vehicle will then be able to pull out without difficulty.

These chains have overcome the difficulties and disadvantages of existing chains of this type, in that they may be applied and removed by the single operation of fastening or removing the hook on the free end of the chain to the spoke clamp.

It is obvious that various changes, modifications and variations might be resorted to without departing from the spirit and scope of my invention, and hence I do not wish to limit myself to the exact disclosure hereof.

What I claim is:—

1. An emergency traction unit for quick application to and removal from a vehicle wheel, consisting essentially of a flexible traction member provided with attached means for removably encircling a wheel spoke to anchor the traction member thereto, said means being flexibly coupled to one end of said member and embodying a loop, the free opposite end of said member having an attached hook quickly applicable to and detachable from said loop to simultaneously lock said means on the spoke and said member in operative position on the wheel, or to release said means for removal with the said attached member.

2. An emergency traction unit for vehicle wheels, consisting essentially of a traction member and means permanently attached thereto for anchoring said member to a wheel spoke and in operative position on the wheel tire whereby the member and said means constitute a unitary structure for application to and removal from the wheel, said means embodying a device attached to one end of said member for removably encircling a wheel spoke and a lock for said device consisting of a loop forming a permanent part thereof and a coöperating locking and coupling hook attached to the free opposite end of said member and quickly attachable to and detachable from said loop.

3. An emergency traction unit for vehicle wheels, consisting essentially of a flexible traction member and attached means for anchoring the same to a wheel spoke and in operative position on a tire, said means comprising a spoke clamp of permanently connected members attached to one end of said traction member and a lock for said clamp embodying a coupling and locking hook attached to the opposite free end of said traction member.

4. An emergency traction unit for vehicle wheels, consisting essentially of a length of traction chain at one end having means attached thereto for removably encircling a wheel spoke and anchoring the chain thereto and in operative position on the tire tread, the opposite free end of said chain having a coupling and locking device attached thereto for coöperation with said means to simultaneously lock the same on the spoke and couple said chain end thereto, and to unlock said means and release said chain end for removal of the chain and its attached means and device as a unitary structure.

5. An emergency traction unit for vehicle wheels, consisting essentially of a flexible traction member provided with a flexible spoke-embracing clamp and with a member-coupling and clamp-locking element, said clamp being flexibly coupled to one end of said member and being constructed and arranged to open and close for quick release from and application to a wheel spoke for anchoring the member thereto and in operative position on the tread of the tire, said clamp having a portion for coöperating with said element to couple said element to the clamp and lock the clamp in spoke encircling position, said member-coupling and clamp-locking element being flexibly coupled to the other end of said traction member and constructed and arranged for quick attachment to and detachment from said portion of the clamp to simultaneously couple said end of the member to the clamp and lock the clamp, and to simultaneously release said end of the member and unlock the clamp for removal of said member with its clamp and element.

6. An emergency traction device for vehicle wheels, comprising a clamp adapted to removably encircle a wheel spoke and embodying free ends adapted to approximately meet in parallelism when the clamp is closed on the spoke, one of said ends being slotted and the other formed with a loop adapted to project through and beyond said slotted end, in combination with a traction member having one end coupled to said clamp and another end provided with a member-coupling and clamp-locking element for detachably coupling said last-mentioned end of the member to said loop and for locking the clamp in closed position.

7. An emergency traction device for vehicle wheels, comprising a flexible spoke embracing clamp having approximately radial opposing free ends, one of said ends having a laterally extending loop, the other end being slotted to receive said loop, in combination with a traction member having an end flexibly coupled to said free end provided with the loop, and a locking hook attached to another end of said member and adapted to detachably engage the end of the loop projecting through said slot to lock the clamp on the spoke and couple said end of the member to the clamp.

8. An emergency traction device for vehicle wheels, comprising a flexible traction member at one end provided with and loosely coupled to a clamp adapted to removably engage a wheel spoke and anchor the member thereto, said clamp formed with free ends, one end of said traction member being loosely coupled to one of said clamp ends which clamp end is provided with a laterally projecting loop, the other clamp end being slotted for the passage of said loop, and a coupling and clamp-locking element attached to another end of said member and formed to detachably engage said loop to couple said member thereto and to coöperate with said loop to tightly wedge said clamp ends toward each other.

9. A device of the character substantially as set forth comprising an encircling clamp provided with projecting free ends approximately parallel and engaging when the clamp is closed, one of said ends having a lateral loop and the other end slotted to receive said loop, and a coupling and clamp locking hook constructed to detachably engage the end of said loop projecting through said slot and wedge said ends tightly toward each other and lock the clamp in closed position.

JOHN REICHERT.

Corrections in Letters Patent No. 1,292,879.

It is hereby certified that in Letters Patent No. 1,292,879, granted January 28, 1919, upon the application of John Reichert, of Racine, Wisconsin, for an improvement in "Tire-Chains," errors appear in the printed specification requiring correction as follows: Page 3, line 115, claim 9, strike out the word "free"; same page and claim, line 122, after the word "slot" insert a period, and commencing with the word "and" strike out all to the end of the claim; and that the said Letters Patent should be read with these corrections therein that the same may conform to the record of the case in the Patent Office.

Signed and sealed this 4th day of March, A. D., 1919.

[SEAL.]

R. F. WHITEHEAD,
*Acting Commissioner of Patents.*

Cl. 152—14.